United States Patent
Sharma et al.

(10) Patent No.: US 12,067,017 B1
(45) Date of Patent: Aug. 20, 2024

(54) DATA MANIPULATION TECHNIQUES FOR SERVICES IN A NETWORK

(71) Applicant: Amazon Technologies, Inc., Seattle, WA (US)

(72) Inventors: Mohit Sharma, Hyderabad (IN); Sean W Blakey, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/190,377

(22) Filed: Mar. 27, 2023

(51) Int. Cl.
*G06F 16/2455* (2019.01)
*G06F 16/23* (2019.01)

(52) U.S. Cl.
CPC .... *G06F 16/24564* (2019.01); *G06F 16/2358* (2019.01)

(58) Field of Classification Search
None
See application file for complete search history.

(56) References Cited

U.S. PATENT DOCUMENTS

| | | | | |
|---|---|---|---|---|
| 2009/0307743 | A1* | 12/2009 | Azagury | G06F 21/604 726/1 |
| 2011/0153579 | A1* | 6/2011 | Paknad | G06Q 10/10 707/694 |
| 2014/0236910 | A1* | 8/2014 | Owuor | G06F 16/23 707/694 |
| 2021/0014282 | A1* | 1/2021 | Anctil | H04L 63/205 |
| 2023/0139493 | A1* | 5/2023 | Gollapinni | G06F 16/185 707/694 |

* cited by examiner

*Primary Examiner* — Irene Baker
(74) *Attorney, Agent, or Firm* — Kilpatrick Townsend & Stockton LLP

(57) ABSTRACT

Data storage techniques for services in a network are described herein. In an example, a computer system determines a mapping between a first data schema associated with first data storage by a first service in a first data store and a second data schema associated with second data storage by a second service in a second data store. The computer system receives an event associated with an element and determines, based on the mapping and the event, an operation to be performed on a first attribute of the element that is stored in the first data store the second data store. The computer system generates, based on the mapping, notifications indicating a time for the operation associated with the first attribute to be performed by the first service and the second service. The computer system sends the notifications to the first service and to the second service.

20 Claims, 10 Drawing Sheets

DATA MANIPULATION TECHNIQUES FOR SERVICES IN A NETWORK

BACKGROUND

Services in communication with a computer system may each store data related to the same elements. A data schema for the data storage may be different for each service. So, performing operations on the data across each of the services may be time and resource intensive for the computer system.

BRIEF DESCRIPTION OF THE DRAWINGS

Various embodiments in accordance with the present disclosure will be described with reference to the drawings, in which.

DETAILED DESCRIPTION

Figure 1:
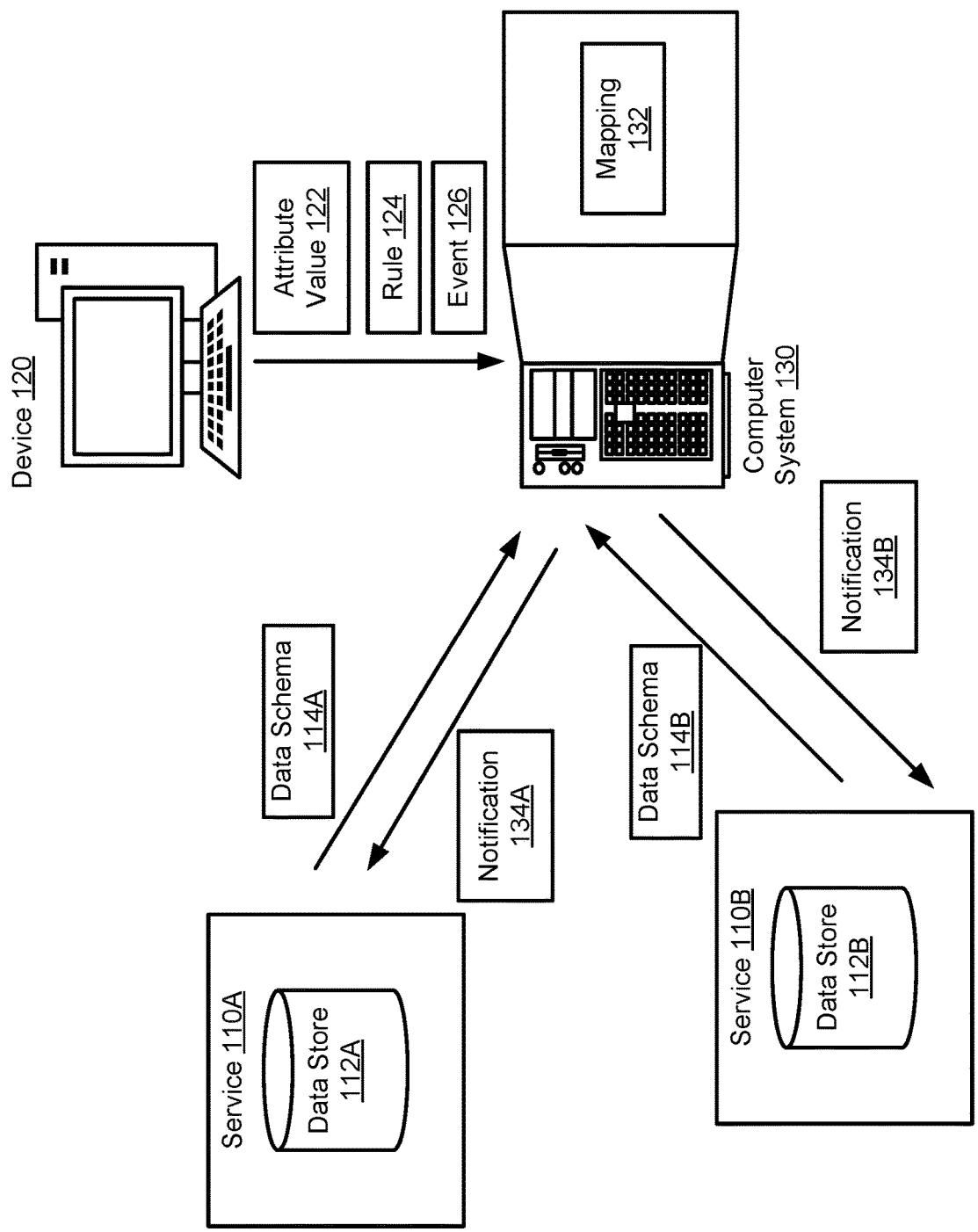
FIG. 1 illustrates an example of a system implementing data storage techniques for services in a network, according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, data manipulation techniques for services in a network. In particular, the embodiments relate to performing operations on data stored across various client services in the network according to different schemas. In an example, a computer system can generate a mapping between data schemas for various services, where each service stores attributes of elements according to a respective data schema. Upon receiving an event associated with an element, the computer system determines an operation that is to be performed on an attribute of the element that is stored in respective data stores of the services. For instance, the operation may be a data addition, a data modification, or a data removal of an attribute value of the attribute. Using the mapping, the computer system generates notifications for each service. Each notification indicates the attribute according to the relevant schema and the time for the operation to be performed. The computer system then sends the notifications to the services so that the services can perform the operations at the corresponding time.

To illustrate, consider a network of services associated with an entity. The network can include a first service and a second service, which can each be in communication with a computing node. Each of the services includes a data store that stores attributes associated with people and a processor that performs operations on the stored data. An example attribute is the last name of a person. The first service stores the last name in association with a "last name" column in a first data store, while the second service stores the last name in association with a "surname" column in a second data store. The services can notify the computing node of their respective data schemas, and the computing node can determine that the "last name" entry in a first data schema for the first service and the "surname" entry in a second data schema for the second service map to the same element (e.g., a "family name" element). The computing node determines the mapping and stores a rule associated with removing last names from the data stores two years after an employment termination. Upon receiving a termination event of the person, the computer system accesses the mapping and determines that the "last name" entry for the first service and the "surname" entry for the second service are associated with the rule for the event. The computer system then generates a first notification indicating that the "last name" entry for the person is to be removed from the first data store in two years. The computer system also generates a second notification indicating that the "surname" entry for the person is to be removed from the second data store in two years. The computer system sends the first notification to the first service and the second notification to the second service so that the last name can be removed from the data stores in two years, in accordance with the rule.

Embodiments of the present disclosure may provide several technical improvements over conventional techniques for data storage for services in a network. For example, conventional techniques may involve a system analyzing each service individually to determine whether a rule is applicable for that service. And if the rule is deemed applicable, the system may have to determine how attributes are stored for that service so that an instruction for a data operation can be generated that is usable by the service. Individual assessment of each service may involve significant computation time and resources, especially in examples with a large number of services that each store attributes for a significant amount of elements. In contrast, the computer system of the present disclosure generates and stores a mapping between data schemas of various services so that rules can efficiently be processed to notify services of operations that are to be performed. As such, better data management, data operation integrity, and data security can be achieved by relying on the mapping as part of executing a set of rules for data storage across multiple data stores.

Although aspects of the present disclosure are discussed with respect to operations involving removal of data from data stores, the embodiments are not limited to removal operations. Other operations may involve adding attribute values, modifying attribute values, combining attributes, or any other suitable operation applicable to data storage (including, for instance, querying different data stores).

FIG. 1 illustrates an example of a system implementing data storage techniques for services in a network, according to an embodiment of the present disclosure. The system includes services 110A-B, a device 120, and a computer system 130, which may all be part of a network. The services 110A-B may include client applications that each performs operations in association with the computer system 130, which may be a computing node of the network. For instance, service 110A may be an employment system and service 110B may be an inventory control system. The device 120 may be a user device for interacting with the computer system 130. Although device 120 is illustrated as a desktop computer, the device 120 may be any suitable user device (e.g., laptop computer, mobile phone, etc.).

Each of the services 110A-B can include a data store 112 that stores data associated with elements. That is, service 110A can include data store 112A and service 110B can include data store 112B. As described herein, the elements may relate to people (e.g., employees) associated with the services 110A-B, but in other examples the elements may be different (e.g., relate to products, animals, etc.). Each of the services 110A-B may store attributes according to different data schemas. For instance, service 110A may store attributes in the data store 112A according to data schema 114A and service 110B may store attributes in the data store 112B according to data schema 114B. In general, the data schemas 114A-B describe how attributes are stored in the data stores 112A-B. As a particular example, an attribute may be a last name of a person. The data store 112A may store the last name in a category (e.g., column) labeled "last name", whereas the data store 112B may store the last name in a category labeled "surname".

The computer system 130 may receive an attribute value 122 of an attribute of an element. For example, the device 120 may send an indication of the last name of a person to the computer system 130. The computer system 130 can also receive the data schemas 114A-B of the services 110A-B, according to which the last name is being stored in the data stores 112A-B. The device 120 can send a rule 124 associated with the attribute and an event 126. For instance, the rule 124 may specify that for a termination event of an employment, the relevant last name is to be stored by the services 110A-B for two years before being removed from the data stores 112A-B. In some examples, the rule 124 may be different for each of the services 110A-B. So, the rule 124 may specify that for a termination event of an employment, the relevant last name is to be stored by the service 110A for one year before being removed from the data store 112A and is to be stored by the service 110B for two years before being removed from the data store 112B.

In an example, the computer system 130 can generate and store a mapping 132 between the data schemas 114A-B. As further described herein below, the computer system 130 may determine hash values of the attribute value being stored according to the data schemas 114A-B to determine which fields match between the data schemas 114A-B. These matching fields can then be associated with each other in the mapping 132. As an example, the computer system 130 can determine that the "last name" field of the data schema 114A matches the "surname" field of the data schema 114B, so the computer system 130 can associate the "last name" field with the "surname" field for the last name attribute in the mapping 132. In addition, the computer system 130 can associate the rule 124 with the last name attribute in the mapping 132. So, for an attribute, the mapping 132 can specify the matching fields between the data schemas 114A-B along with the associated rules for that attribute.

In an example, the computer system 130 can hash multiple values to increase likelihood of a proper match between attributes. For instance, in addition to generating hash values of the attribute values stored according to the data schemas 114A-B, the computer system 130 may determine hash values of attribute types corresponding to such attribute and/or may generate hash values from metadata associated with the attributes. For an attribute in the data store 112A and an attribute in the data store 112B, if a threshold number of the hash values match, the computer system 130 can associate the attributes with each other in the mapping 132.

At some point in time, the computer system 130 can receive the event 126 associated with a change to the element. For instance, the event 126 may be the termination of the employment of the person. The computer system 130 can then determine an operation to be performed on the attribute that is stored in the data stores 112A-B based on the mapping 132 and the event 126. For example, in response to the computer system 130 receiving the event 126 of the termination, the computer system 130 can look up the mapping and determine that the last name attribute is to be removed from the data stores 112A-B two years after the termination.

In an example, the computer system 130 can generate one or more notifications 134A-B for each of the services 110A-B based on the rule 124 and the mapping 132. A notification generated for a service can indicate the attribute on which an operation is to be performed, where the indication is according to the data schema of the service and is derived based on the mapping. A notification can also indicate the time that the operation is to be performed. So, the notifications 134A-B associated with the last name attribute can indicate a time of removal for the last name of the person of two years from the receipt of the event 126, in addition to indicating the "last name" attribute for the first service 110A and the "surname" attribute for the second service 110B. The computer system 130 can then send the notifications 134A-B to the services 110A-B, which can perform the operation at the time indicated in the notifications 134A-B. That is, the services 110A-B can remove the last name of the person from the data stores 112A-B two years after the termination event.

In some instances, the event 126 may be associated with multiple rules for operations to be performed for different attributes. For example, the event 126 may be associated with removing the last name attribute after two years and an employment history attribute after six months from the time of the event 126. The computer system 130 can also generate a notification for the services 110A-B that store the employment history attribute. For instance, if the employment history attribute is stored according to the data schema 114A in the data store 112A, but is absent from the data store 112B, the computer system 130 may only generate and send a notification for the time of removal of the employment history attribute for the service 110A. The notification may be separate from the notification 134A. So, the computer system 130 may send the notification associated with the employment history attribute to the service 110A after six months pass from receiving the event 126 and then send the notifications 134A-B associated with the last name attribute to the services 110A-B after two years pass from receiving the event 126.

Alternatively, the computer system 130 may generate a single notification that includes an indication of the time for each operation. So, the computer system 130 can generate the notification 134A that indicates the removal operation for the employment history attribute that is to be performed six months after the event 126 and the removal operation for the last name attribute that is to be performed two years after the event 126. The computer system 130 can send the notification 134A to the service 110A prior to six months passing from the occurrence of the event 126.

Figure 2:
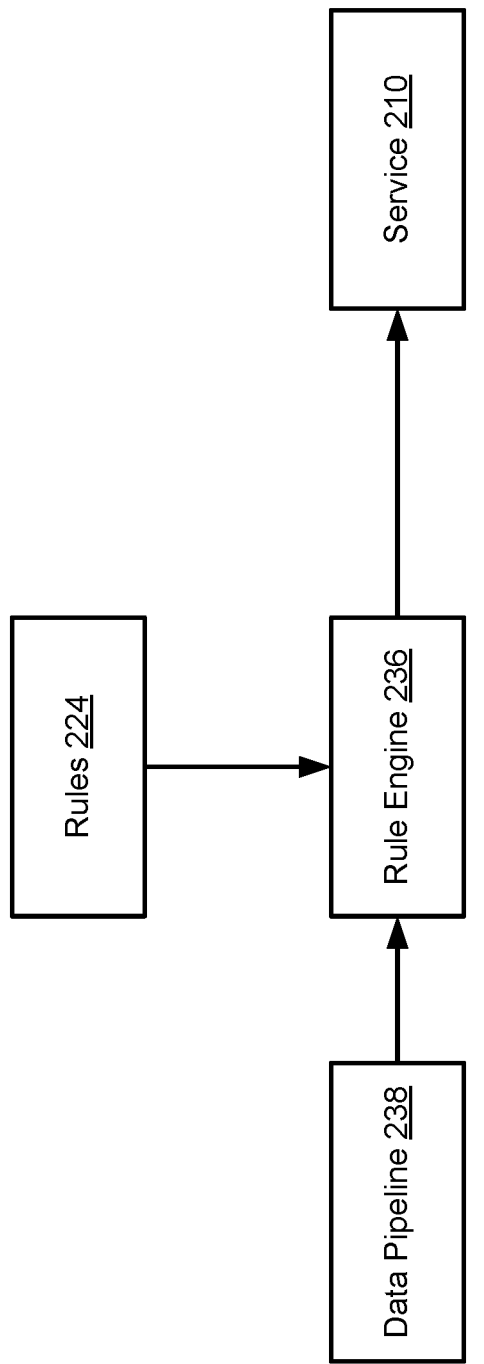
FIG. 2 illustrates an example of a system implementing data storage techniques for services in a network without a client connector, according to an embodiment of the present disclosure.

FIG. 2 illustrates an example of a system implementing data storage techniques for services in a network without a client connector, according to an embodiment of the present disclosure. A rule engine 236 can receive a data pipeline 238 and communicate with a service 210, which may be an example of the service 110A in FIG. 1. The rule engine 236 may be part of a computer system, such as computer system 130 in FIG. 1.

In an example, the rule engine 236 can receive rules 224 associated with attributes and events. The rules 224 may specify operations that are to be performed for attributes stored by the service 210 in response to various events. For instance, the rules 224 may specify removal operations for attributes, modification operations for attributes, and any other suitable operations. Examples of events include termination of employment events, promotion events, start of employment events, etc. The rules 224 may satisfy privacy, compliance, and security policies, such as those associated with the General Data Protection Regulation (GDPR).

In response to receiving an event, which can be included in the data pipeline 238, the rule engine 236 can determine the operations that are to be performed based on the rules 224. The rule engine 236 may determine the event is associated with a rule for an attribute stored by the service 210. The rule engine 236 can determine how the attribute is stored by the service 210 and then send a notification of the operation, that is to be performed, to the service 210.

While this determination may be simple when the rule engine 236 is only in communication with one service, the rule processing and notification may be difficult when the rule engine 236 communicates with multiple services that each store attributes according to different data schemas. For instance, the rule engine 236 may need to determine how each service stores the attribute associated with the rule. The rule engine 236 can then individually generate notifications for each service. Overall, as the number of services increases, the processing time for events increases and the rule engine 236 may become a bottleneck of the system.

Figure 3:
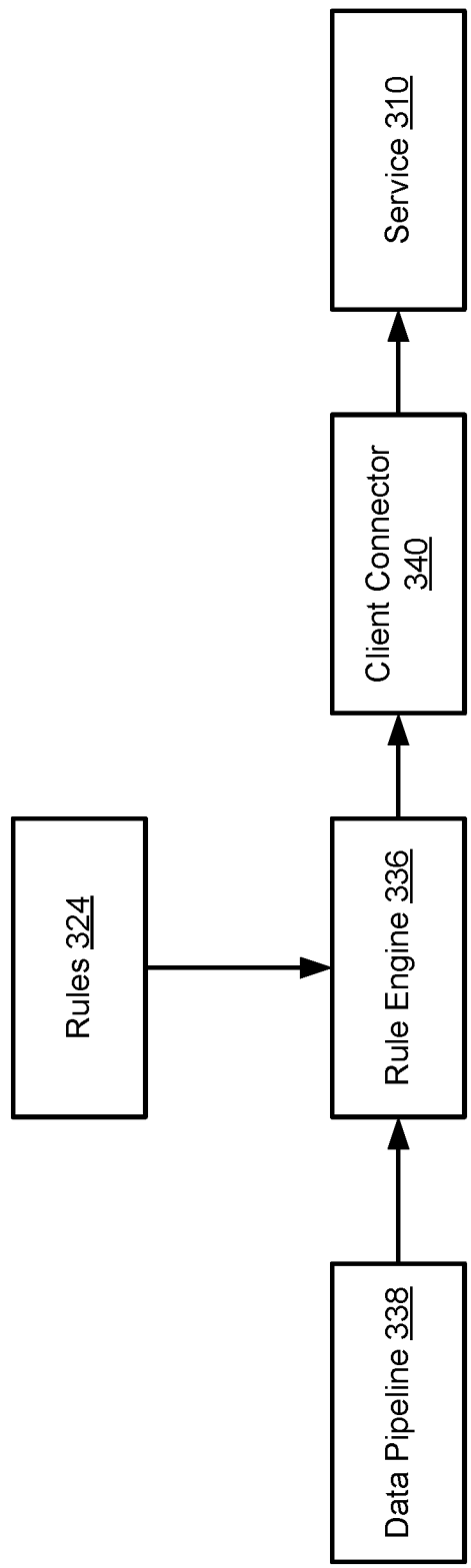
FIG. 3 illustrates an example of a system implementing data storage techniques for services in a network with a client connector, according to an embodiment of the present disclosure.

FIG. 3 illustrates an example of a system implementing data storage techniques for services in a network with a client connector, according to an embodiment of the present disclosure. A rule engine 336 can receive a data pipeline 338 and communicate with a service 310 via a client connector 340. The rule engine 336 may be part of a computer system, such as computer system 130 in FIG. 1. The client connector 340 can include a component on the service side as well as a component on the computer system side. For instance, the component of the client connector 340 on the service side may be a library that periodically scans for new data stored by the service 310. The service side component can report to the computer system side component, which generates and stores a mapping between data schemas of each of the services.

In an example, the rule engine 336 can receive rules 324 associated with attributes and events. The rules 324 may specify operations that are to be performed for attributes stored by the service 310 in response to various events. For instance, the rules 324 may specify removal operations for attributes, modification operations for attributes, and any other suitable operations. Examples of events include termination of employment events, promotion events, start of employment events, etc. The rules 324 may satisfy privacy, compliance, and security policies, such as those associated with the GDPR.

In response to receiving an event, which can be included in the data pipeline 338, the rule engine 336 can determine the operations that are to be performed based on the rules 324. The rule engine 336 may determine the event is associated with a rule for an attribute stored by the service 310. The rule engine 336 can determine how the attribute is stored by the service 310 and then send a notification of the operation that is to be performed to the service 310.

For multiple services, the client connector 340 can determine how the attribute is stored for each service. The client connector 340 creates a mapping between how the attribute is stored and stores the mapping. To process events for multiple services, the client connector 340 can communicate with the rule engine 336 and use the mapping to efficiently determine how to notify each of the services of an operation that is to be performed. That is, rather than individually determining how the rule should be applied to each service, the client connector 340 can locate the attribute associated with the rule in the mapping and determine each service that is to be notified and how the notification should be configured for the corresponding service.

In an example, an attribute may not be permitted to cross certain regional borders. For instance, a tax identifier of a person may be able to be stored in a data store in a first region (e.g., India), but may be prohibited from leaving the first region based on the rules 324. Based on the mapping, the client connector 340 can detect the attribute and whether the regulation applies, and then notify the service 310 of the applicable regulation. Additionally or alternatively, the client connector 340 may notify the service 310 if the regulation is breached.

In addition, the rules 324 may define security permissions for the stored attributes. For instance, there may be attribute level access permissions. The client connector 340 can detect the security permissions and send that information to an application controller of the service 310 that can then implement the attribute level access permissions. For instance, certain users of a first access level may have access to a first set of attributes stored by the service 310, whereas other users of a second access level may have access to a second set of attributes that includes the first set of attributes and additional attributes. In this illustration, the client connector 340 can inform the application controller about these two access levels. In turn, when user input is received and requests data access, the application controller can enforce the access levels by determining whether the data access is to be permitted or not.

Figure 4:
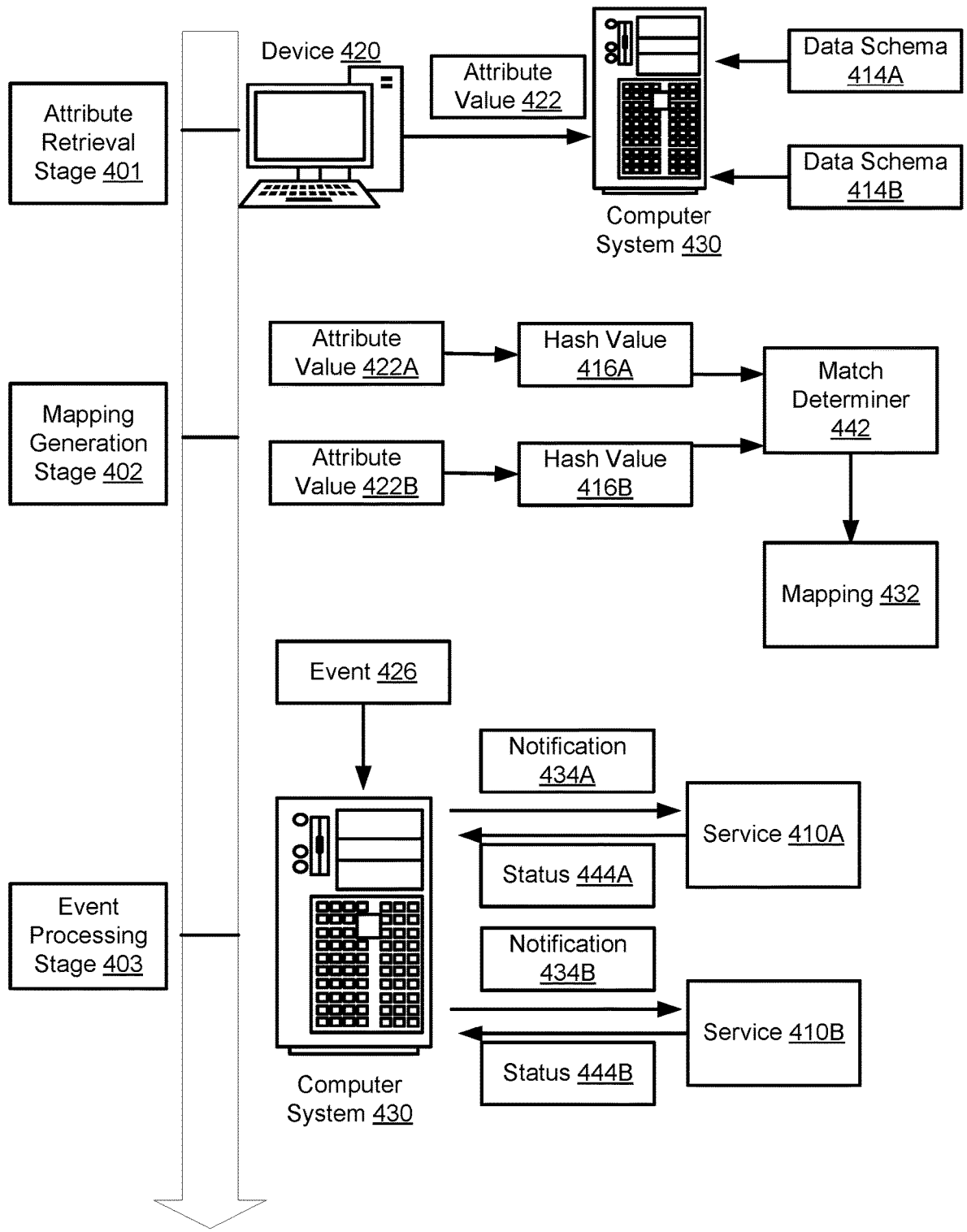
FIG. 4 illustrates an example of stages for data storage techniques for services in a network, according to an embodiment of the present disclosure.

FIG. 4 illustrates an example of stages for data storage techniques for services in a network, according to an embodiment of the present disclosure. The stages include an attribute retrieval stage 401, a mapping generation stage 402, and an event processing stage 403.

In an example, the attribute retrieval stage 401 involves a computer system 430, which is an example of the computer system 130 in FIG. 1, receiving an attribute value 422 for an attribute. In an example, the attribute may be a job location of a person. For instance, the attribute value 422 may specify that the person is employed in Phoenix, Arizona. The computer system 430 can also receive data schemas 414A-B that describe how attributes are stored for different services.

For instance, data schema 414A can be associated with a first service and data schema 414B may be associated with a second service. As an example, the data schema 414A may indicate that the job location is stored in an entry as "City, State" (e.g., an attribute value of "Phoenix, Arizona") by the first service and the data schema 414B may indicate that the job location is stored in a first entry of "City" and a second entry of "State" (e.g., an attribute value of "Phoenix" in the first entry and "Arizona" in the second entry) by the second service.

In an example, the mapping generation stage 402 involves generating a mapping 432 between the data schemas 414A-B. To generate the mapping 432, hash values 416A-B of the attribute values 422A-B for the attribute stored according to the data schemas 414A-B are generated. The computer system 430 can generate the hash values 416A-B. Hash value 416A can correspond to attribute value 422A stored according to data schema 414A and hash value 416B can correspond to attribute value 422B stored according to data schema 414B. A match determiner 442 can then compare the hash values 416A-B. If the match determiner 442 determines that hash value 416A matches hash value 416B, then the computer system 430 can determine that attribute value 422A is to be associated with attribute value 422B in the mapping 432. The mapping 432 can include an association between the entry in a first data store of the first service for the attribute and the entries in a second data store of the second service for the attribute based on determining the match.

In an example, the event processing stage 403 involves the computer system 430 receiving and processing an event 426 associated with an element. For instance, the event 426 may be a termination of employment for a person. Upon receiving the event 426, the computer system 430 may determine a rule associated with the event 426 and the attribute. For example, the mapping 432 may include associations between attributes and rules, such that the computer system 430 can determine operations that are to be performed for the attributes in response to the event 426. The rule may specify that the job location attribute is to be removed from the first data store and the second data store three months after the event 426. So, the computer system 430 can generate notifications 434A-B indicating the time (e.g., three months) for the operation of removing the attribute values 422A-B based on the mapping 432. Additionally, the computer system 430 may determine the entry in the first data store that is associated with the attribute and the entries in the second data store that are associated with the attribute based on the mapping 432. Each of the notifications 434A-B can include an indication of the associated entry(ies) for the respective service 410A-B. The computer system 430 may send the notifications 434A-B to services 410A-B upon receiving the event 426 or subsequent to the time associated with the operation passing.

The services 410A-B can perform the operation of removing the attribute values 422A-B based on the notifications 434A-B by locating the attribute values 422A-B in the respective data stores once the time associated with the operation passes and then perform the operation (e.g., removal) for the attribute values 422A-B. The services 410A-B can send statuses 444A-B to the operation to the computer system 430. For instance, the computer system 430 may receive the status 444A of the completion of the removal of the attribute value 422A from the first data store from the service 410A. The computer system 430 can then store an indication of the status 444A that indicates a successful performance of the operation. Alternatively, the computer system 430 may not receive the status 444B of the completion of the removal of the attribute value 422B from the second data store from the service 410B. So, the computer system 430 may store an indication of a failed performance of the operation by the service 410B. Based on the failed performance, the computer system 430 can generate another notification that is to be performed by the service 410B. The notification can indicate the attribute in the second data store based on the mapping 432 and can be sent to the service 410B.

Figure 5:
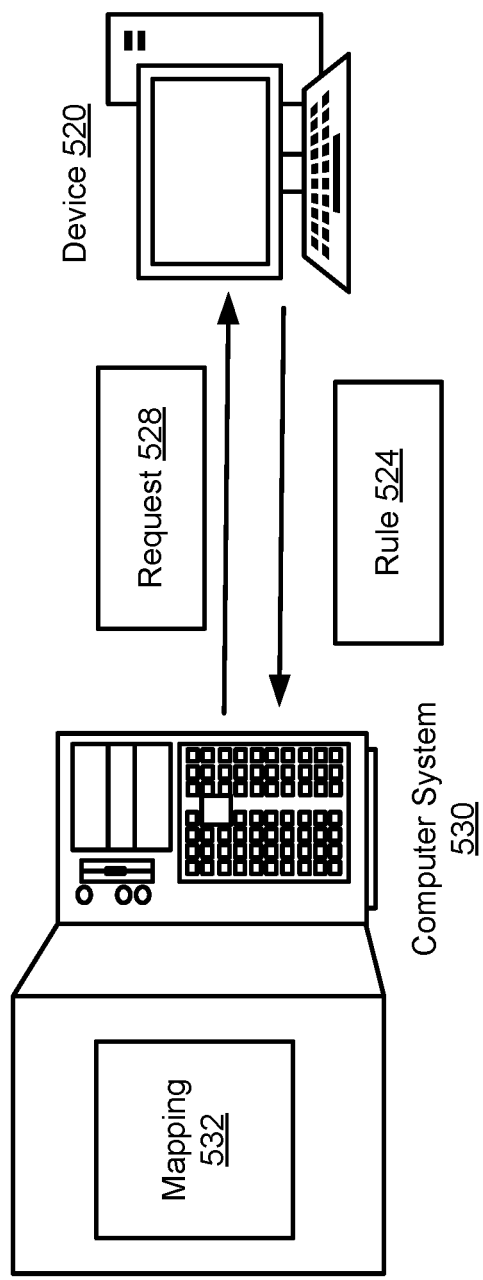
FIG. 5 illustrates an example of rule reception for processing events, according to an embodiment of the present disclosure.

FIG. 5 illustrates an example of rule reception for processing events, according to an embodiment of the present disclosure. A computer system 530, which is an example of the computer system 130 in FIG. 1, stores a mapping 532 between data schemas for storing attributes for various services. The attributes can be stored in data stores for each of the services. The mapping 532 can also associate attributes with rules specifying operations that are to be performed on the attributes in response to events.

In an example, the computer system 530 may determine that an attribute lacks an associated rule for modifying the attribute in the data stores in response to an event. The computer system 530 can send a request 528 for the associated rule to a device 520, which is an example of device 120 in FIG. 1. The request 528 can include an indication of the attribute and can be displayed on a user interface of the device 520. A user may provide the rule 524 for the attribute using the user interface, and the device 520 can then send the rule 524 to the computer system 530, which can then store the rule 524 in association with the attribute in the mapping 532.

Figure 6:
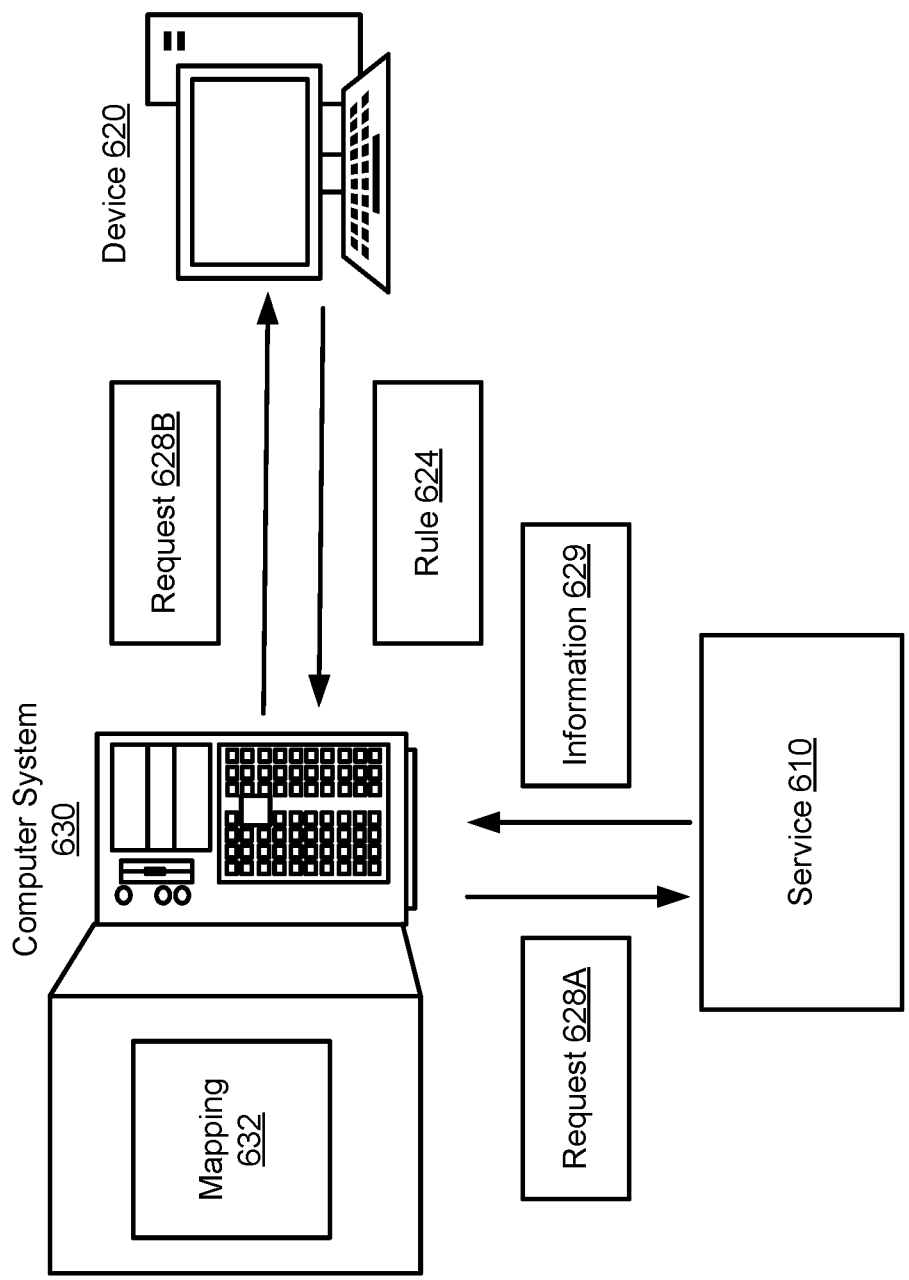
FIG. 6 illustrates another example of rule reception for processing events, according to an embodiment of the present disclosure.

FIG. 6 illustrates another example of rule reception for processing events, according to an embodiment of the present disclosure. A computer system 630, which is an example of the computer system 130 in FIG. 1, stores a mapping 632 between data schemas for storing attributes for various services. The attributes can be stored in data stores for each of the services. The mapping 632 can also associate attributes with rules specifying operations that are to be performed on the attributes in response to events.

In an example, the computer system 630 may determine that an attribute lacks an associated rule for modifying the attribute in the data stores in response to an event. The computer system 630 can send a request 628A to a service 610 that stores an attribute value for the attribute. The request 628A may be a request for information 629 associated with the attribute. For instance, the information 629 may be about from where the service 610 received the attribute, what the attribute describes, or any other suitable information. The computer system 630 can then send a request 628B for the associated rule to a device 620, which is an example of device 120 in FIG. 1. The request 628B can include an indication of the attribute and the information 629. The request 628A can be displayed on a user interface of the device 620. A user may provide the rule 624 for the attribute using the user interface, and the device 620 can then send the rule 624 to the computer system 630, which can then store the rule 624 in association with the attribute in the mapping 632.

Figure 7:
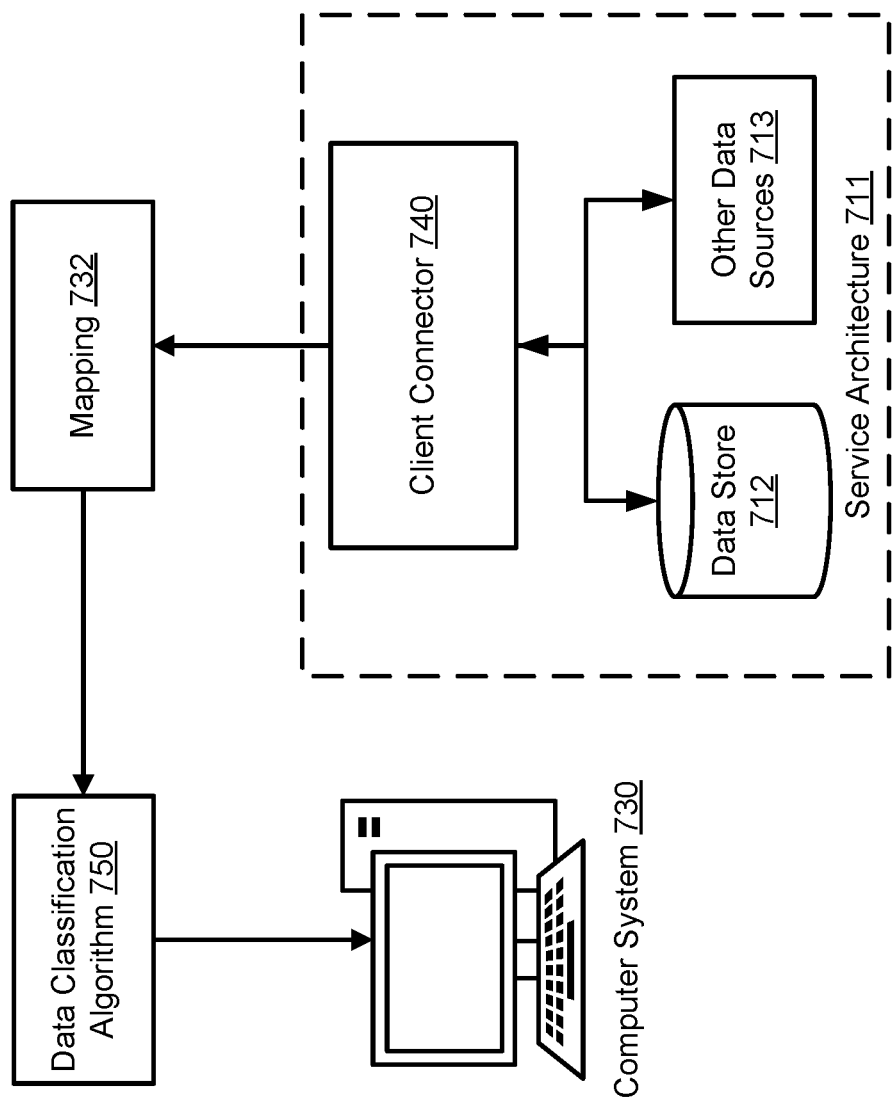
FIG. 7 illustrates an example architecture for data storage techniques for services in a network, according to an embodiment of the present disclosure.

FIG. 7 illustrates an example architecture for data storage techniques for services in a network, according to an embodiment of the present disclosure. A service architecture 711, which represents components of a service (e.g., service 110A in FIG. 1) includes a client connector 740, a data store 712, and other data sources 713. The data store 712 can store attributes of an element according to a data schema. The other data sources 713 may store information associated with the service. The client connector 740 can periodically (e.g., every day or once a week) scan the data store 712 for new data (e.g., new attributes or updated attribute values) and then send the new data to a computer system (e.g., computer system 130 in FIG. 1). The computer system can generate a mapping 732 between the data schema of the service and data schemas of other services that are also in communication with the computer system. Based on the mapping 732, which represents a data dictionary of the attributes stored by the services, the computer system may execute a data classification algorithm 750 with preconfigured policies to generate a recommendation of policies for the service. The policies can be rules for operations that the service should perform in response to events.

Figure 8:
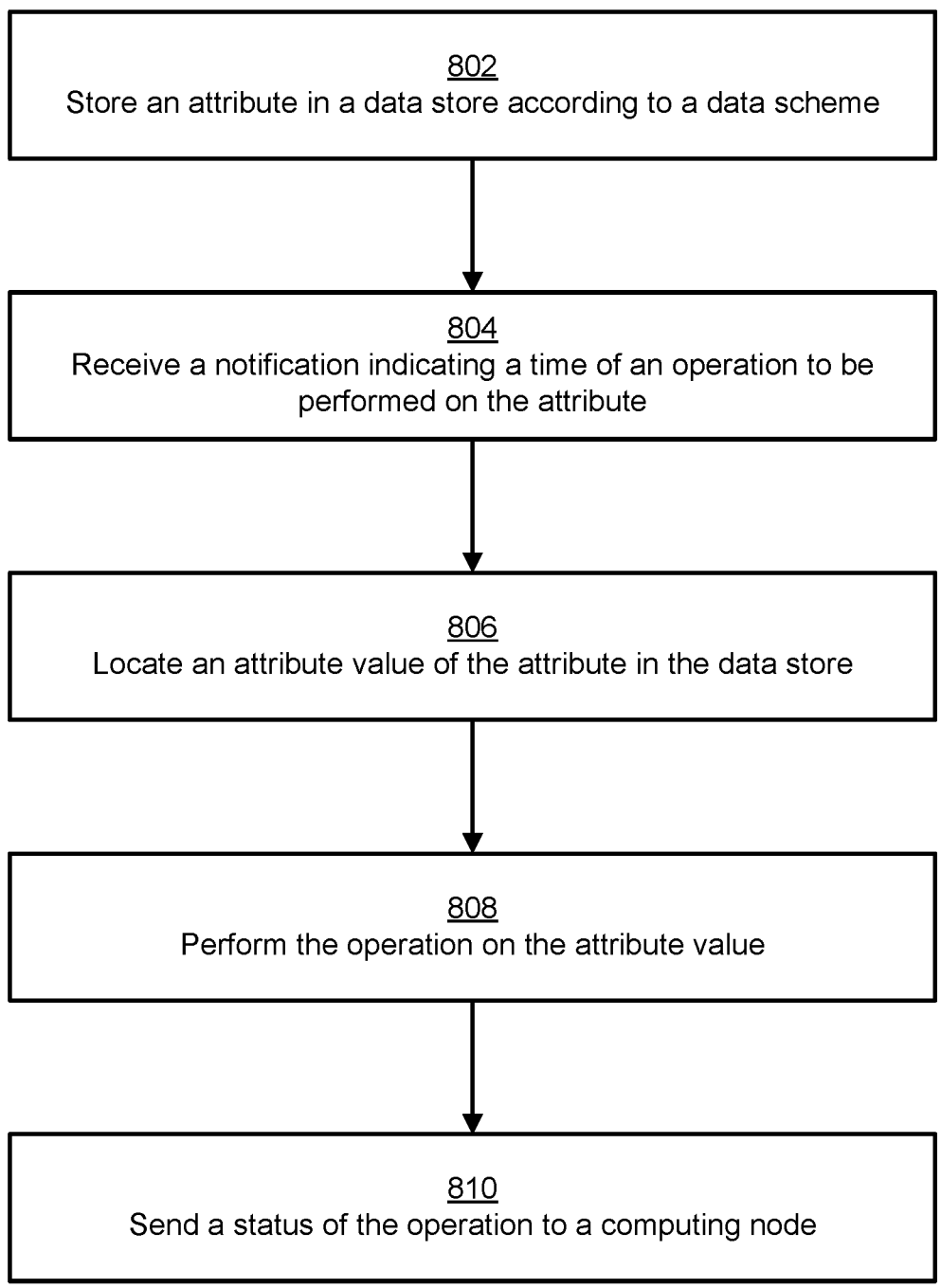
FIG. 8 illustrates an example of a flow for a service performing operations on stored attributes, according to an embodiment of the present disclosure.

FIG. 8 illustrates an example of a flow for a service performing operations on stored attributes, according to an embodiment of the present disclosure. Some or all of the processes (or any other processes described herein, or variations, and/or combinations thereof) may be performed under the control of one or more services, such as the service 110A in FIG. 1, configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

In an example, the flow includes operation 802, where the service stores an attribute in a data store according to a data schema. For example, the service may be a payroll system, an inventory control system, a travel management system, a human resources system, etc. The attributes can describe characteristics of elements, such as employees. For instance, the attributes may include a name, job level, work assignment country, job location, employment history, etc. Multiple services may store the same attributes, but each service may have their own data schema for how the attributes are stored. The services can be in communication with a computing node of a network.

In an example, the flow includes operation 804, where the service receives a notification indicating a time of an operation to be performed on the attribute. In response to the computing node receiving an event for an element, such as a termination of employment of an employee, the computing node determines the operation that is to be performed on the attribute based on a rule associated with the event. The rule may be stored in a mapping between the various data schemas. The computing node can generate a notification for the service that stores the attribute based on the rule. As an example, the notification may indicate that the attribute is to be removed from the data store two weeks after the computing node receives the event.

In an example, the flow includes operation 806, where the service locates an attribute value of the attribute in the data store. The service can locate the attribute value subsequent to the time passing based on the notification. The notification may indicate one or more entries in the data store that are associated with the attribute, and thus include the attribute value. So, the service can locate the entries based on the notification.

In an example, the flow includes operation 808, where the service performs the operation on the attribute value. For instance, the service can remove the attribute value from the data store. Alternatively, the operation may be different than a removal operation and the service can perform the appropriate action as indicated in the notification.

In an example, the flow includes operation 810, where the service sends a status of the operation to a computing node. The status can indicate a successful completion of the operation. If the computing node does not receive the status within a predetermined time of the time of the operation, the computing node may generate and send an additional notification of the operation to the service.

Figure 9:
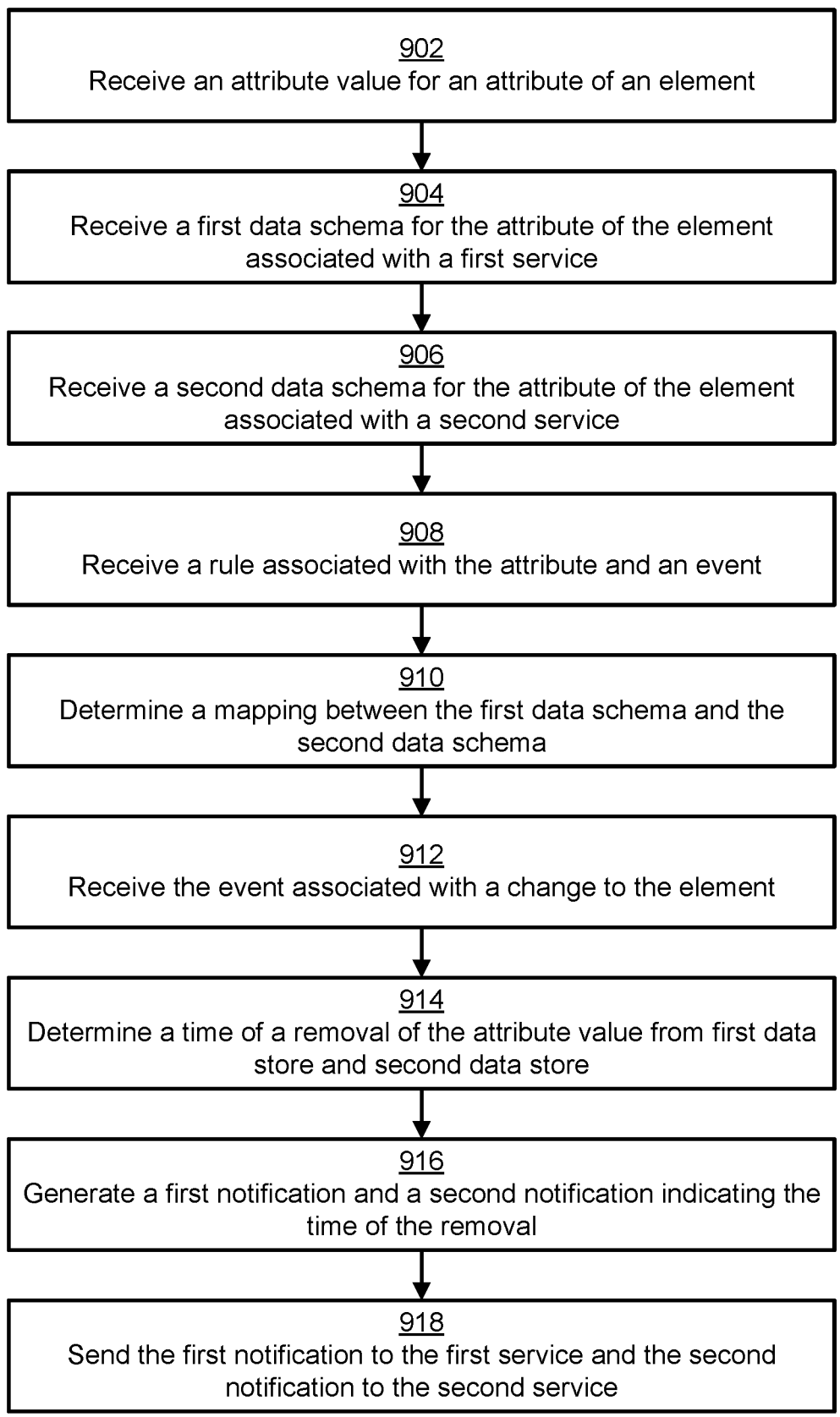
FIG. 9 illustrates an example of an overall flow for data storage techniques for services in a network, according to an embodiment of the present disclosure.

FIG. 9 illustrates an example of an overall flow for data storage techniques for services in a network, according to an embodiment of the present disclosure. Some or all of the processes (or any other processes described herein, or variations, and/or combinations thereof) may be performed under the control of one or more computer systems, such as the computer system 130 in FIG. 1, configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

In an example, the flow includes operation 902, where the computer system receives an attribute value for an attribute of an element. The attribute value may be received in response to an update of a data store for one or more services. For instance, each of a first service and a second service may detect an update to their respective data stores, where the update includes an addition of an attribute value of a job title for a person.

In an example, the flow includes operation 904, where the computer system receives a first data schema for the attribute of the element associated with a first service. The attribute value is stored according to the first data schema in a first data store associated with a first service. For instance, the job title attribute may be associated with a "Job Position" label in the first data store, and the attribute value can be stored in an entry associated with the "Job Position" label, as indicated in the first data schema.

In an example, the flow includes operation 906, where the computer system receives a second data schema for the attribute of the element associated with a second service. The attribute value is stored according to the second data schema in a second data store associated with a second service. For instance, the job title attribute may be associated with a "Role" label in the second data store, and the attribute value can be stored in an entry associated with the "Role" label, as indicated in the second data schema.

In an example, the flow includes operation 908, where the computer system receives a rule associated with the attribute and an event. The rule can specify an operation that is to be performed on the attribute value in response to the event. The rule may be provided by a user associated with the computer system.

In an example, the flow includes operation 910, where the computer system determines a mapping between the first data schema and the second data schema. The computer system may determine a first hash value of the attribute value stored according to the first data schema and a second hash value of the attribute value stored according to the second data schema. The computer system can then determine whether the first hash value and the second hash value match, and upon determining that they match, the computer system can determine that the first hash value and the second hash value correspond to the same attribute for the element. The mapping associates the attribute with the rule.

In an example, the flow includes operation 912, where the computer system receives the event associated with a change to the element. The event may be a change to a status of the element, such as a termination of employment of the person.

In an example, the flow includes operation 914, where the computer system determines a time of a removal of the attribute value from the first data store and the second data store. The time of the removal of the attribute can be based on the rule associated with the attribute and the event. For instance, the rule may specify that the job title attribute is to be removed from the first data store and the second data store five months after the termination of employment. So, the computer system can determine the time of the removal of the attribute to be five months from when the event was received.

In an example, the flow includes operation 916, where the computer system generates a first notification and a second notification indicating the time of the removal. The first notification can indicate the entry in the first data store that is associated with the attribute value based on the mapping. The second notification can indicate the entry in the second data store that is associated with the attribute value based on the mapping.

In an example, the flow includes operation 918, where the computer system sends the first notification to the first service and the second notification to the second service. The first service and the second service can remove the attribute from the first data store and the second data store, respectively, at the time of the removal. The first service and the second service may additionally provide a status back to the computer system about the performance of the operation.

Figure 10:
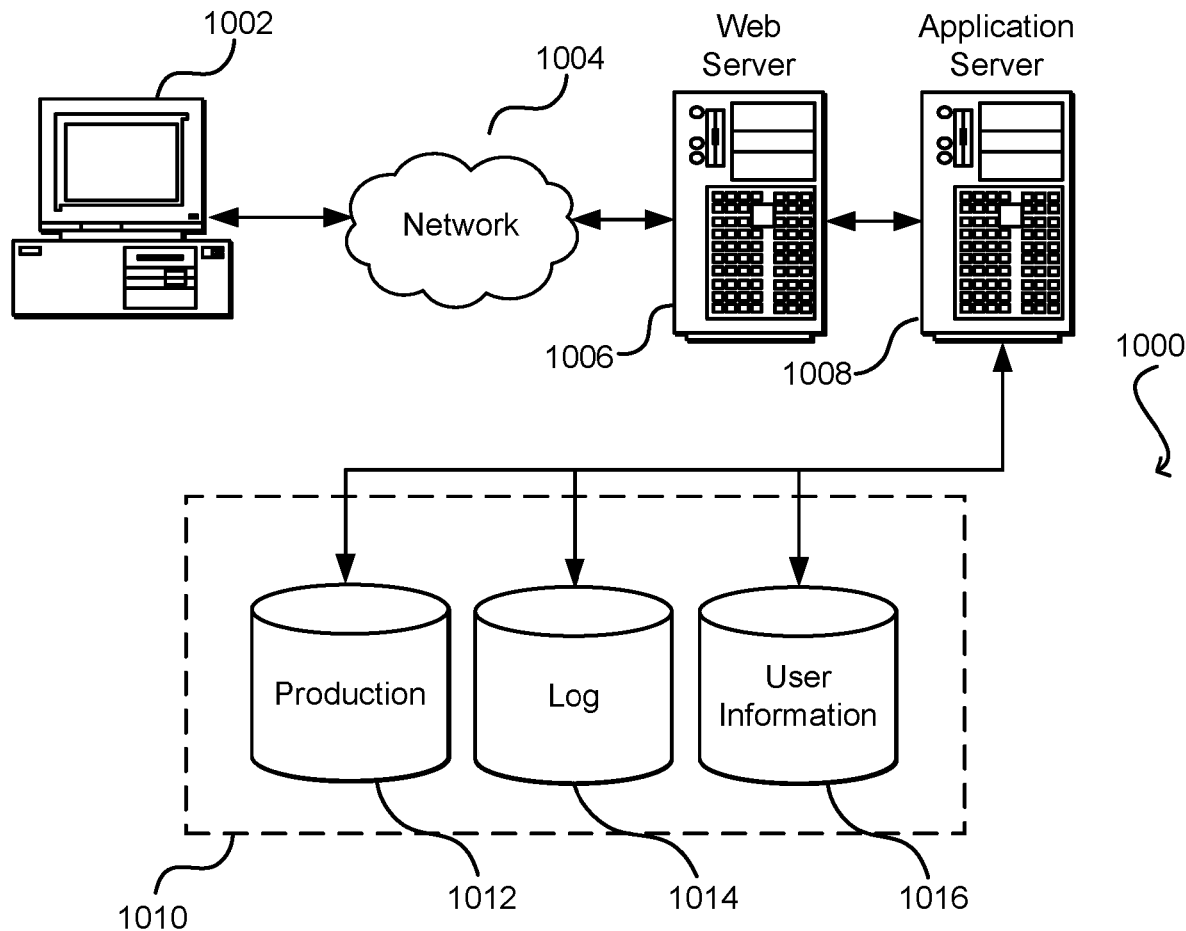
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:
   one or more processors; and
   one or more memory storing instructions that, upon execution by the one or more processors, configure the system to:
   receive a first attribute value for a first attribute of an element;
   receive a first data schema for the first attribute, the first attribute value being stored according to the first data schema in a first data store associated with a first service;
   receive a second data schema for the first attribute, the first attribute value being stored according to the second data schema in a second data store associated with a second service;
   receive a rule associated with the first attribute and an event;
   determine a mapping between the first data schema and the second data schema, wherein the mapping associates the first attribute with the rule;
   receive the event associated with a change to the element;
   determine, for the first service and the second service, a time of a removal of the first attribute value from the first data store and the second data store based at least in part on the rule;
   generate, based at least in part on the rule and the mapping, a first notification indicating the time of the removal of the first attribute value for the first service and a second notification indicating the time of the removal of the first attribute value for the second service; and
   send the first notification to the first service and the second notification to the second service for removing the first attribute from the first data store and the second data store at the time of the removal.

2. The system of claim 1, wherein the one or more memory store further instructions that, upon execution by the one or more processors, configure the system to determine the mapping between the first data schema and the second data schema by at least:
   generating a first hash value of the first attribute value being stored according to the first data schema;
   generating a second hash value of the first attribute value being stored according to the second data schema; and
   determining a match between the first hash value and the second hash value.

3. The system of claim 1, wherein the first data schema is further associated with a second attribute of the element, and wherein the one or more memory store further instructions that, upon execution by the one or more processors, configure the system to:
   determine the second attribute lacks an associated rule for removing the second attribute from the first data store in response to the event;
   output, to a device, a request for the associated rule, wherein the request includes an indication of the second attribute;
   receive the associated rule from the device; and
   store the associated rule with the second attribute in the mapping.

4. The system of claim 1, wherein the first data schema is further associated with a second attribute of the element, and wherein the one or more memory store further instructions that, upon execution by the one or more processors, configure the system to:
   determine the second attribute lacks an associated rule for removing the second attribute from the first data store in response to the event;
   send, to the first service, a first request for information corresponding to the second attribute;
   receive the information corresponding to the second attribute from the first service;
   output, to a device, a second request for the associated rule, wherein the second request includes an indication of the second attribute and the information;
   receive the associated rule from the device; and store the associated rule with the second attribute in the mapping.

5. A method implemented by a computing node in a computer network, the method comprising:
  determining a mapping between a first data schema and a second data schema, the first data schema associated with first data storage by a first service in a first data store, the second data schema associated with second data storage by a second service in a second data store;
  receiving an event associated with an element;
  determining, based at least in part on the mapping and the event, an operation to be performed on a first attribute of the element that is stored in the first data store according to the first data schema and the second data store according to the second data schema;
  generating, based at least in part on the mapping, a first notification indicating a first time for the operation associated with the first attribute to be performed by the first service and a second notification indicating a second time for the operation to be performed by the second service; and
  sending the first notification to the first service and the second notification to the second service.

6. The method of claim 5, further comprising:
  receiving a rule associated with the first attribute and the event; and
  storing the rule in the mapping in association with the first attribute.

7. The method of claim 3, further comprising:
  determining a second attribute for the element is stored in the first data store and is absent from the second data store;
  determining a third time of a second operation for the second attribute based at least in part on another rule associated with the second attribute in the mapping; and
  sending a third notification indicating the second operation to be performed and a third time of the second operation to the first service.

8. The method of claim 5, further comprising:
  receiving a status of the operation from the first service, wherein the first service is configured to:
    receive the first notification indicating the first time of the operation to be performed on the first attribute;
    locate an attribute value of the first attribute in the first data store subsequent to the first time passing;
    perform the operation on the attribute value; and
    send the status of the operation to the computing node in response to performing the operation.

9. The method of claim 8, further comprising:
  storing, in response to receiving the status of the operation from the first service, a first indication of the status of the operation performed by the first service, wherein the status indicates a successful performance of the operation; and
  storing, in response to lacking a reception of a status indication of the operation from the second service, a second indication of a failed performance of the operation by the second service.

10. The method of claim 9, further comprising:
  generating, based at least in part on the failed performance, a third notification of the operation to be performed by the second service, the third notification indicating the first attribute in the second data store based at least in part on the mapping; and
  sending the third notification to the second service.

11. The method of claim 5, further comprising:
  determining, based on the mapping, that the first attribute is associated with another rule prohibiting attribute data that represents the first attribute from being sent to a computing device located outside of a region; and
  notifying the first service of the other rule for controlling transmission of the attribute data.

12. The method of claim 5, further comprising:
  determining, based on the mapping, that the first attribute is associated with a first security permission and a second attribute stored by the first service is associated with a second security permission; and
  sending an indication of the first security permission and the second security permission to the first service for controlling access to the first attribute and the second attribute.

13. One or more non-transitory computer-readable storage media storing instructions that, upon execution by a system, cause the system to perform operations comprising:
  determining a mapping between a first data schema and a second data schema, the first data schema associated with first data storage by a first service in a first data store, the second data schema associated with second data storage by a second service in a second data store;
  receiving an event associated with an element;
  determining, based at least in part on the mapping and the event, an operation to be performed on a first attribute of the element that is stored in the first data store according to the first data schema and the second data store according to the second data schema;
  generating a first notification indicating a first time for the operation associated with the first attribute to be performed by the first service and a second notification indicating a second time for the operation to be performed by the second service based at least in part on the mapping; and
  sending the first notification to the first service and the second notification to the second service.

14. The one or more non-transitory computer-readable storage media of claim 13 storing further instructions that, upon execution by the system, cause the system to perform additional operations comprising:
  determining a first entry in the first data store is associated with the first attribute based at least in part on the mapping; and
  indicating the first entry in the first notification.

15. The one or more non-transitory computer-readable storage media of claim 14 storing further instructions that, upon execution by the system, cause the system to perform additional operations comprising:
  determining a second entry in the second data store is associated with the first attribute based at least in part on the mapping, wherein the first entry is different than the second entry; and
  indicating the second entry in the second notification.

16. The one or more non-transitory computer-readable storage media of claim 13 storing further instructions that, upon execution by the system, cause the system to perform additional operations comprising:
  receiving an update to the first data schema from the first service, wherein the update comprises a second attribute value for a second attribute of the element;
  determining the mapping between the second attribute value stored according to the first data schema and the second attribute value stored according to the second data schema; and
  storing the mapping between the first data schema and the second data schema for the second attribute in association with a second rule for modifying the second attribute value in response to the event associated with the element.

17. The one or more non-transitory computer-readable storage media of claim 13 storing further instructions that, upon execution by the system, cause the system to perform additional operations comprising:
generating a first set of hash values for the first attribute being stored according to the first data schema, wherein the first set of hash values includes at least one of a first hash value of the first attribute, a second hash value of a first attribute type of the first attribute, or a third hash value of metadata associated with the first attribute;
generating a second set of hash values for the first attribute being stored according to the second data schema;
determining a match between the first set of hash values and the second set of hash values; and
determining the mapping based at least in part on the match.

18. The one or more non-transitory computer-readable storage media of claim 13 storing further instructions that, upon execution by the system, cause the system to perform additional operations comprising:
determining a first entry in the first data store is associated with the first attribute based at least in part on the first data schema;
determining a second entry and a third entry in the second data store is associated with the first attribute based at least in part on the second data schema; and
storing an association between the first entry in the first data store and the second entry and the third entry in the second data store in the mapping.

19. The one or more non-transitory computer-readable storage media of claim 13 storing further instructions that, upon execution by the system, cause the system to perform additional operations comprising:
determining a third time of a second operation for a second attribute of the element based at least in part on another rule associated with the second attribute in the mapping, wherein the third time is subsequent to the first time;
sending the first notification indicating the operation to be performed and the first time of the operation to the first service subsequent to the first time passing; and
sending a third notification indicating the second operation to be performed and a third time of the second operation to the first service subsequent to the third time passing.

20. The one or more non-transitory computer-readable storage media of claim 13 storing further instructions that, upon execution by the system, cause the system to perform additional operations comprising:
determining a third time of a second operation for a second attribute of the element based at least in part on another rule associated with the second attribute in the mapping, wherein the third time is subsequent to the first time; and
sending the first notification indicating the operation to be performed and the first time of the operation and the second operation to be performed and the third time of the second operation the first service.

\* \* \* \* \*